US011968329B2

(12) United States Patent
Kassel (10) Patent No.: US 11,968,329 B2
(45) Date of Patent: Apr. 23, 2024

(54) SYSTEMS AND METHODS RELATING TO ROUTING INCOMING INTERACTIONS IN A CONTACT CENTER

(71) Applicant: GENESYS CLOUD SERVICES, INC., Daly City, CA (US)

(72) Inventor: Robert Kassel, Daly City, CA (US)

( * ) Notice: Subject to any disclaimer, the term of this patent is extended or adjusted under 35 U.S.C. 154(b) by 49 days.

(21) Appl. No.: 17/480,752

(22) Filed: Sep. 21, 2021

(65) Prior Publication Data
US 2023/0085756 A1 Mar. 23, 2023

(51) Int. Cl.
*H04M 3/00* (2006.01)
*G06Q 10/0639* (2023.01)
*H04M 3/51* (2006.01)
*H04M 3/523* (2006.01)

(52) U.S. Cl.
CPC .... *H04M 3/5233* (2013.01); *G06Q 10/06395* (2013.01); *H04M 3/5175* (2013.01); *H04M 3/5238* (2013.01)

(58) Field of Classification Search
CPC ............. H04M 3/5233; H04M 3/5175; H04M 3/5238; G06Q 10/06395
See application file for complete search history.

(56) References Cited

U.S. PATENT DOCUMENTS

2017/0208177 A1 7/2017 Conway et al.

OTHER PUBLICATIONS

International Search Report and Written Opinion regarding co-pending PCT application having application No. PCT/US2022/044214 dated Dec. 14, 2022.

*Primary Examiner* — Rasha S Al Aubaidi (57) ABSTRACT

A method for routing incoming interactions in a contact center. The incoming interactions are instigated by customers for communicating with the contact center, and the contact center includes agents between which the incoming interactions are routed. The method includes: determining a routing interval; identifying received incoming interactions for inclusion in a received interactions batch, each of the received incoming interactions being identified as ones of the incoming interactions that are received within the routing interval; identifying candidate agents for inclusion in a candidate agent group, the candidate agents being identified as available ones of the agents to whom the received incoming interactions of the received interaction batch can be routed; and subsequent to the end of the routing interval, routing the received incoming interactions included in the received interaction batch to the candidate agents included in the candidate agent group.

20 Claims, 5 Drawing Sheets

SYSTEMS AND METHODS RELATING TO ROUTING INCOMING INTERACTIONS IN A CONTACT CENTER

BACKGROUND

The present invention generally relates to telecommunications systems in the field of customer relations management including customer assistance via internet-based service options and/or communications with contact centers. More particularly, but not by way of limitation, the present invention pertains to systems and methods for routing incoming interactions to a contact center.

BRIEF DESCRIPTION OF THE INVENTION

The present invention includes a computer-implemented method for routing incoming interactions in a contact center. The incoming interactions are instigated by customers for communicating with the contact center, and the contact center includes agents between which the incoming interactions are routed. The method may include the steps of: determining a routing interval; identifying received incoming interactions for inclusion in a received interactions batch, each of the received incoming interactions being identified as ones of the incoming interactions that are received within the routing interval; identifying candidate agents for inclusion in a candidate agent group, the candidate agents being identified as available ones of the agents to whom the received incoming interactions of the received interaction batch can be routed; and subsequent to the end of the routing interval, routing the received incoming interactions included in the received interaction batch to the candidate agents included in the candidate agent group.

These and other features of the present application will become more apparent upon review of the following detailed description of the example embodiments when taken in conjunction with the drawings and the appended claims.

BRIEF DESCRIPTION OF THE DRAWINGS

A more complete appreciation of the present invention will become more readily apparent as the invention becomes better understood by reference to the following detailed description when considered in conjunction with the accompanying drawings, in which like reference symbols indicate like components, wherein.

DETAILED DESCRIPTION

For the purposes of promoting an understanding of the principles of the invention, reference will now be made to the exemplary embodiments illustrated in the drawings and specific language will be used to describe the same. It will be apparent, however, to one having ordinary skill in the art that the detailed material provided in the examples may not be needed to practice the present invention. In other instances, well-known materials or methods have not been described in detail in order to avoid obscuring the present invention. Additionally, further modification in the provided examples or application of the principles of the invention, as presented herein, are contemplated as would normally occur to those skilled in the art.

As used herein, language designating nonlimiting examples and illustrations includes "e.g.", "i.e.", "for example", "for instance" and the like. Further, reference throughout this specification to "an embodiment", "one embodiment", "present embodiments", "exemplary embodiments", "certain embodiments" and the like means that a particular feature, structure or characteristic described in connection with the given example may be included in at least one embodiment of the present invention. Thus, appearances of the phrases "an embodiment", "one embodiment", "present embodiments", "exemplary embodiments", "certain embodiments" and the like are not necessarily referring to the same embodiment or example. Further, particular features, structures or characteristics may be combined in any suitable combinations and/or sub-combinations in one or more embodiments or examples.

Those skilled in the art will recognize from the present disclosure that the various embodiments may be computer implemented using many different types of data processing equipment, with embodiments being implemented as an apparatus, method, or computer program product. Example embodiments, thus, may take the form of an entirely hardware embodiment, an entirely software embodiment, or an embodiment combining software and hardware aspects. Example embodiments further may take the form of a computer program product embodied by computer-usable program code in any tangible medium of expression. In each case, the example embodiment may be generally referred to as a "module", "system", or "method".

The flowcharts and block diagrams provided in the figures illustrate architecture, functionality, and operation of possible implementations of systems, methods, and computer program products in accordance with example embodiments of the present invention. In this regard, it will be understood that each block of the flowcharts and/or block diagrams—or combinations of those blocks—may represent a module, segment, or portion of program code having one or more executable instructions for implementing the specified logical functions. It will similarly be understood that each of block of the flowcharts and/or block diagrams—or combinations of those blocks—may be implemented by special purpose hardware-based systems or combinations of special purpose hardware and computer instructions performing the specified acts or functions. Such computer program instructions also may be stored in a computer-readable medium that can direct a computer or other programmable data processing apparatus to function in a particular manner, such that the program instructions in the computer-readable medium produces an article of manufacture that includes instructions by which the functions or acts specified in each block of the flowcharts and/or block diagrams—or combinations of those blocks—are implemented.

Computing Device

Figure 1:
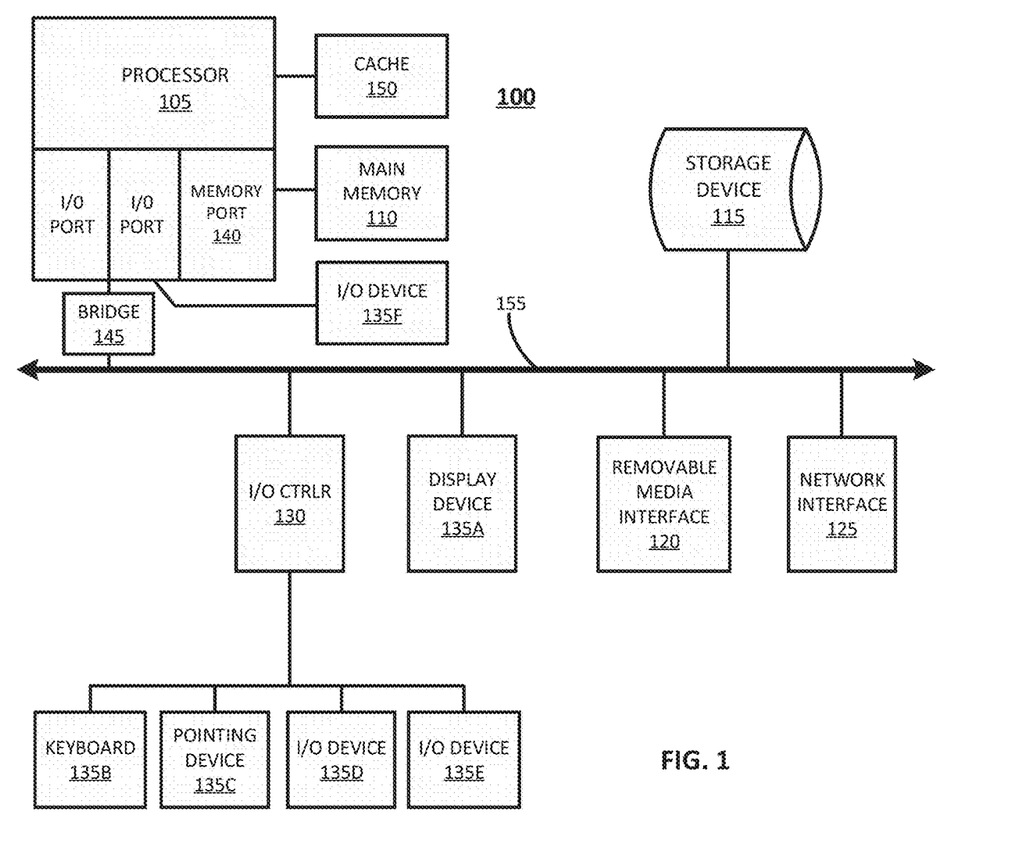
FIG. 1 depicts a schematic block diagram of a computing device in accordance with exemplary embodiments of the present invention and/or with which exemplary embodiments of the present invention may be enabled or practiced.

It will be appreciated that the systems and methods of the present invention may be computer implemented using many different forms of data processing equipment, for example, digital microprocessors and associated memory, executing appropriate software programs. By way of background, FIG. 1 illustrates a schematic block diagram of an exemplary computing device 100 in accordance with embodiments of the present invention and/or with which those embodiments may be enabled or practiced. It should be understood that FIG. 1 is provided as a non-limiting example.

The computing device 100, for example, may be implemented via firmware (e.g., an application-specific integrated circuit), hardware, or a combination of software, firmware, and hardware. It will be appreciated that each of the servers, controllers, switches, gateways, engines, and/or modules in the following figures (which collectively may be referred to as servers or modules) may be implemented via one or more of the computing devices 100. As an example, the various servers may be a process running on one or more processors of one or more computing devices 100, which may be executing computer program instructions and interacting with other systems or modules in order to perform the various functionalities described herein. Unless otherwise specifically limited, the functionality described in relation to a plurality of computing devices may be integrated into a single computing device, or the various functionalities described in relation to a single computing device may be distributed across several computing devices. Further, in relation to the computing systems described in the following figures—such as, for example, the contact center 200 of FIG. 2—the various servers and computer devices thereof may be located on local computing devices 100 (i.e., on-site or at the same physical location as contact center agents), remote computing devices 100 (i.e., off-site or in a cloud computing environment, for example, in a remote data center connected to the contact center via a network), or some combination thereof. Functionality provided by servers located on off-site computing devices may be accessed and provided over a virtual private network (VPN), as if such servers were on-site, or the functionality may be provided using a software as a service (SaaS) accessed over the Internet using various protocols, such as by exchanging data via extensible markup language (XML), JSON, and the like.

As shown in the illustrated example, the computing device 100 may include a central processing unit (CPU) or processor 105 and a main memory 110. The computing device 100 may also include a storage device 115, removable media interface 120, network interface 125, I/O controller 130, and one or more input/output (I/O) devices 135, which as depicted may include an, display device 135A, keyboard 135B, and pointing device 135C. The computing device 100 further may include additional elements, such as a memory port 140, a bridge 145, I/O ports, one or more additional input/output devices 135D, 135E, 135F, and a cache memory 150 in communication with the processor 105.

The processor 105 may be any logic circuitry that responds to and processes instructions fetched from the main memory 110. For example, the process 105 may be implemented by an integrated circuit, e.g., a microprocessor, microcontroller, or graphics processing unit, or in a field-programmable gate array or application-specific integrated circuit. As depicted, the processor 105 may communicate directly with the cache memory 150 via a secondary bus or backside bus. The cache memory 150 typically has a faster response time than main memory 110. The main memory 110 may be one or more memory chips capable of storing data and allowing stored data to be directly accessed by the central processing unit 105. The storage device 115 may provide storage for an operating system, which controls scheduling tasks and access to system resources, and other software. Unless otherwise limited, the computing device 100 may include an operating system and software capable of performing the functionality described herein.

As depicted in the illustrated example, the computing device 100 may include a wide variety of I/O devices 135, one or more of which may be connected via the I/0 controller 130. Input devices, for example, may include a keyboard 135B and a pointing device 135C, e.g., a mouse or optical pen. Output devices, for example, may include video display devices, speakers, and printers. The I/O devices 135 and/or the I/O controller 130 may include suitable hardware and/or software for enabling the use of multiple display devices. The computing device 100 may also support one or more removable media interfaces 120, such as a disk drive, USB port, or any other device suitable for reading data from or writing data to computer readable media. More generally, the I/O devices 135 may include any conventional devices for performing the functionality described herein.

The computing device 100 may be any workstation, desktop computer, laptop or notebook computer, server machine, virtualized machine, mobile or smart phone, portable telecommunication device, media playing device, gaming system, mobile computing device, or any other type of computing, telecommunications or media device, without limitation, capable of performing the operations and functionality described herein. The computing device 100 includes a plurality of devices connected by a network or connected to other systems and resources via a network. As used herein, a network includes one or more computing devices, machines, clients, client nodes, client machines, client computers, client devices, endpoints, or endpoint nodes in communication with one or more other computing devices, machines, clients, client nodes, client machines, client computers, client devices, endpoints, or endpoint nodes. For example, the network may be a private or public switched telephone network (PSTN), wireless carrier network, local area network (LAN), private wide area network (WAN), public WAN such as the Internet, etc., with connections being established using appropriate communication protocols. More generally, it should be understood that, unless otherwise limited, the computing device 100 may communicate with other computing devices 100 via any type of network using any conventional communication protocol. Further, the network may be a virtual network environment where various network components are virtualized. For example, the various machines may be virtual machines implemented as a software-based computer running on a physical machine, or a "hypervisor" type of virtualization may be used where multiple virtual machines run on the same host physical machine. Other types of virtualization are also contemplated.

Contact Center

Figure 2:
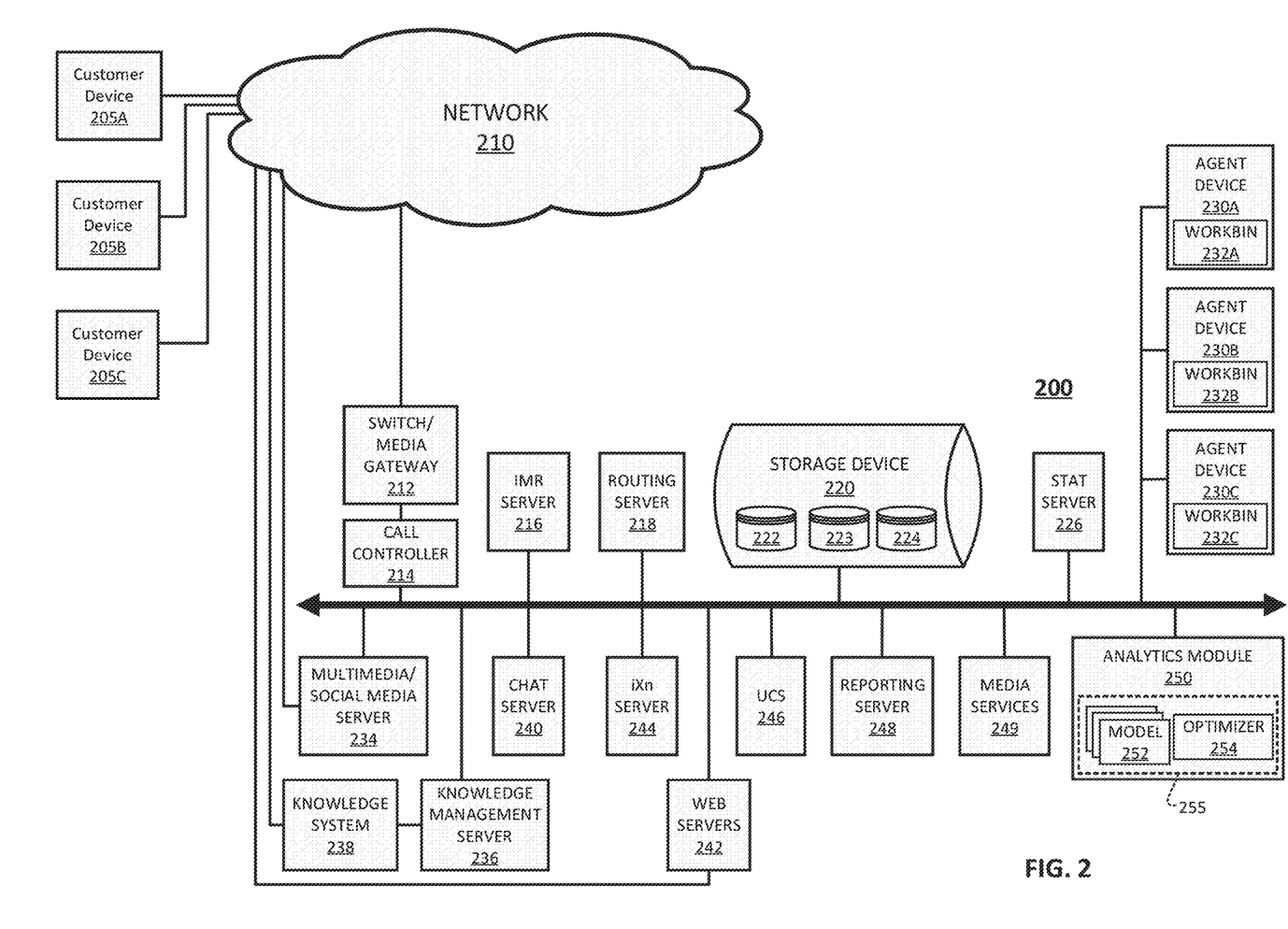
FIG. 2 depicts a schematic block diagram of a communications infrastructure or contact center in accordance with exemplary embodiments of the present invention and/or with which exemplary embodiments of the present invention may be enabled or practiced.

With reference now to FIG. 2, a communications infrastructure or contact center 200 is shown in accordance with exemplary embodiments of the present invention and/or with which exemplary embodiments of the present invention may be enabled or practiced.

By way of background, customer service providers generally offer many types of services through contact centers. Such contact centers may be staffed with employees or customer service agents (or simply "agents"), with the agents serving as an interface between a company, enterprise, government agency, or organization (hereinafter referred to interchangeably as an "organization" or "enterprise") and persons, such as users, individuals, or customers (hereinafter referred to interchangeably as "individuals" or "customers"). For example, the agents at a contact center may assist customers in making purchasing decisions, receiving orders, or solving problems with products or services already received. Within a contact center, such interactions between contact center agents and outside entities or customers may be conducted over a variety of communication channels, such as, for example, via voice (e.g., telephone calls or voice over IP or VoIP calls), video (e.g., video conferencing), text (e.g., emails and text chat), screen sharing, co-browsing, or the like.

Operationally, contact centers generally strive to provide quality services to customers while minimizing costs. For example, one way for a contact center to operate is to handle every customer interaction with a live agent. While this approach may score well in terms of the service quality, it likely would also be prohibitively expensive due to the high cost of agent labor. Because of this, most contact centers utilize some level of automated processes in place of live agents, such as, for example, interactive voice response (IVR) systems, interactive media response (IMR) systems, internet robots or "bots", automated chat modules or "chatbots", and the like. In many cases this has proven to be a successful strategy, as automated processes can be highly efficient in handling certain types of interactions and effective at decreasing the need for live agents. Such automation allows contact centers to target the use of human agents for the more difficult customer interactions, while the automated processes handle the more repetitive or routine tasks. Further, automated processes can be structured in a way that optimizes efficiency and promotes repeatability. Whereas a human or live agent may forget to ask certain questions or follow-up on particular details, such mistakes are typically avoided through the use of automated processes. While customer service providers are increasingly relying on automated processes to interact with customers, the use of such technologies by customers remains far less developed. Thus, while IVR systems, IMR systems, and/or bots are used to automate portions of the interaction on the contact center-side of an interaction, the actions on the customer-side remain for the customer to perform manually.

Referring specifically to FIG. 2, the contact center 200 may be used by a customer service provider to provide various types of services to customers. For example, the contact center 200 may be used to engage and manage interactions in which automated processes (or bots) or human agents communicate with customers. As should be understood, the contact center 200 may be an in-house facility to a business or enterprise for performing the functions of sales and customer service relative to products and services available through the enterprise. In another aspect, the contact center 200 may be operated by a third-party service provider that contracts to provide services for another organization. Further, the contact center 200 may be deployed on equipment dedicated to the enterprise or third-party service provider, and/or deployed in a remote computing environment such as, for example, a private or public cloud environment with infrastructure for supporting multiple contact centers for multiple enterprises. The contact center 200 may include software applications or programs, which may be executed on premises or remotely or some combination thereof. It should further be appreciated that the various components of the contact center 200 may be distributed across various geographic locations and not necessarily contained in a single location or computing environment.

It should further be understood that, unless otherwise specifically limited, any of the computing elements of the present invention may be implemented in cloud-based or cloud computing environments. As used herein, "cloud computing"—or, simply, the "cloud"—is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. Cloud computing can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.). Often referred to as a "serverless architecture", a cloud execution model generally includes a service provider dynamically managing an allocation and provisioning of remote servers for achieving a desired functionality.

In accordance with the illustrated example of FIG. 2, the components or modules of the contact center 200 may include: a plurality of customer devices 205A, 205B, 205C; communications network (or simply "network") 210; switch/media gateway 212; call controller 214; interactive media response (IMR) server 216; routing server 218; storage device 220; statistics (or "stat") server 226; plurality of agent devices 230A, 230B, 230C that include workbins 232A, 232B, 232C, respectively; multimedia/social media server 234; knowledge management server 236 coupled to a knowledge system 238; chat server 240; web servers 242; interaction (or "iXn") server 244; universal contact server (or "UCS") 246; reporting server 248; media services server 249; and analytics module 250. It should be understood that any of the computer-implemented components, modules, or servers described in relation to FIG. 2 or in any of the following figures may be implemented via types of computing devices, such as, for example, the computing device 100 of FIG. 1. As will be seen, the contact center 200 generally manages resources (e.g., personnel, computers, telecommunication equipment, etc.) to enable delivery of services via telephone, email, chat, or other communication mechanisms. Such services may vary depending on the type of contact center and, for example, may include customer service, help desk functionality, emergency response, telemarketing, order taking, and the like.

Customers desiring to receive services from the contact center 200 may initiate inbound communications (e.g., telephone calls, emails, chats, etc.) to the contact center 200 via a customer device 205. While FIG. 2 shows three such customer devices—i.e., customer devices 205A, 205B, and 205C—it should be understood that any number may be present. The customer devices 205, for example, may be a communication device, such as a telephone, smart phone, computer, tablet, or laptop. In accordance with functionality described herein, customers may generally use the customer devices 205 to initiate, manage, and conduct communications with the contact center 200, such as telephone calls, emails, chats, text messages, web-browsing sessions, and other multi-media transactions.

Inbound and outbound communications from and to the customer devices 205 may traverse the network 210, with the nature of network typically depending on the type of customer device being used and form of communication. As an example, the network 210 may include a communication network of telephone, cellular, and/or data services. The network 210 may be a private or public switched telephone network (PSTN), local area network (LAN), private wide area network (WAN), and/or public WAN such as the Internet. Further, the network 210 may include a wireless carrier network including a code division multiple access (CDMA) network, global system for mobile communications (GSM) network, or any wireless network/technology conventional in the art, including but not limited to 3G, 4G, LTE, 5G, etc.

In regard to the switch/media gateway 212, it may be coupled to the network 210 for receiving and transmitting telephone calls between customers and the contact center 200. The switch/media gateway 212 may include a telephone or communication switch configured to function as a central switch for agent level routing within the center. The switch may be a hardware switching system or implemented via software. For example, the switch 215 may include an automatic call distributor, a private branch exchange (PBX), an IP-based software switch, and/or any other switch with specialized hardware and software configured to receive Internet-sourced interactions and/or telephone network-sourced interactions from a customer, and route those interactions to, for example, one of the agent devices 230. Thus, in general, the switch/media gateway 212 establishes a voice connection between the customer and the agent by establishing a connection between the customer device 205 and agent device 230.

As further shown, the switch/media gateway 212 may be coupled to the call controller 214 which, for example, serves as an adapter or interface between the switch and the other routing, monitoring, and communication-handling components of the contact center 200. The call controller 214 may be configured to process PSTN calls, VoIP calls, etc. For example, the call controller 214 may include computer-telephone integration (CTI) software for interfacing with the switch/media gateway and other components. The call controller 214 may include a session initiation protocol (SIP) server for processing SIP calls. The call controller 214 may also extract data about an incoming interaction, such as the customer's telephone number, IP address, or email address, and then communicate these with other contact center components in processing the interaction.

In regard to the interactive media response (IMR) server 216, it may be configured to enable self-help or virtual assistant functionality. Specifically, the IMR server 216 may be similar to an interactive voice response (IVR) server, except that the IMR server 216 is not restricted to voice and may also cover a variety of media channels. In an example illustrating voice, the IMR server 216 may be configured with an IMR script for querying customers on their needs. For example, a contact center for a bank may tell customers via the IMR script to "press 1" if they wish to retrieve their account balance. Through continued interaction with the IMR server 216, customers may receive service without needing to speak with an agent. The IMR server 216 may also be configured to ascertain why a customer is contacting the contact center so that the communication may be routed to the appropriate resource.

In regard to the routing server 218, it may function to route incoming interactions. For example, once it is determined that an inbound communication should be handled by a human agent, functionality within the routing server 218 may select the most appropriate agent and route the communication thereto. This agent selection may be based on which available agent is best suited for handling the communication. More specifically, the selection of appropriate agent may be based on a routing strategy or algorithm that is implemented by the routing server 218. In doing this, the routing server 218 may query data that is relevant to the incoming interaction, for example, data relating to the particular customer, available agents, and the type of interaction, which, as described more below, may be stored in particular databases. Once the agent is selected, the routing server 218 may interact with the call controller 214 to route (i.e., connect) the incoming interaction to the corresponding agent device 230. As part of this connection, information about the customer may be provided to the selected agent via their agent device 230. This information is intended to enhance the service the agent is able to provide to the customer.

Regarding data storage, the contact center 200 may include one or more mass storage devices—represented generally by the storage device 220—for storing data in one or more databases relevant to the functioning of the contact center. For example, the storage device 220 may store customer data that is maintained in a customer database 222. Such customer data may include customer profiles, contact information, service level agreement (SLA), and interaction history (e.g., details of previous interactions with a particular customer, including the nature of previous interactions, disposition data, wait time, handle time, and actions taken by the contact center to resolve customer issues). As another example, the storage device 220 may store agent data in an agent database 223. Agent data maintained by the contact center 200 may include agent availability and agent profiles, schedules, skills, handle time, etc. As another example, the storage device 220 may store interaction data in an interaction database 224. Interaction data may include data relating to numerous past interactions between customers and contact centers. More generally, it should be understood that, unless otherwise specified, the storage device 220 may be configured to include databases and/or store data related to any of the types of information described herein, with those databases and/or data being accessible to the other modules or servers of the contact center 200 in ways that facilitate the functionality described herein. For example, the servers or modules of the contact center 200 may query such databases to retrieve data stored therewithin or transmit data thereto for storage. The storage device 220, for example, may take the form of any conventional storage medium and may be locally housed or operated from a remote location. As an example, the databases may be Cassandra database, NoSQL database, or a SQL database and managed by a database management system, such as, Oracle, IBM DB2, Microsoft SQL server, or Microsoft Access, PostgreSQL.

In regard to the stat server 226, it may be configured to record and aggregate data relating to the performance and operational aspects of the contact center 200. Such information may be compiled by the stat server 226 and made available to other servers and modules, such as the reporting server 248, which then may use the data to produce reports that are used to manage operational aspects of the contact center and execute automated actions in accordance with functionality described herein. Such data may relate to the state of contact center resources, e.g., average wait time, abandonment rate, agent occupancy, and others as functionality described herein would require.

The agent devices 230 of the contact center 200 may be communication devices configured to interact with the various components and modules of the contact center 200 in ways that facilitate functionality described herein. An agent device 230, for example, may include a telephone adapted for regular telephone calls or VoIP calls. An agent device 230 may further include a computing device configured to communicate with the servers of the contact center 200, perform data processing associated with operations, and interface with customers via voice, chat, email, and other multimedia communication mechanisms according to functionality described herein. While FIG. 2 shows three such agent devices—i.e., agent devices 230A, 230B and 230C—it should be understood that any number may be present.

In regard to the multimedia/social media server 234, it may be configured to facilitate media interactions (other than voice) with the customer devices 205 and/or the servers 242. Such media interactions may be related, for example, to email, voice mail, chat, video, text-messaging, web, social media, co-browsing, etc. The multi-media/social media server 234 may take the form of any IP router conventional in the art with specialized hardware and software for receiving, processing, and forwarding multi-media events and communications.

In regard to the knowledge management server 234, it may be configured facilitate interactions between customers and the knowledge system 238. In general, the knowledge system 238 may be a computer system capable of receiving questions or queries and providing answers in response. The knowledge system 238 may be included as part of the contact center 200 or operated remotely by a third party. The knowledge system 238 may include an artificially intelligent computer system capable of answering questions posed in natural language by retrieving information from information sources such as encyclopedias, dictionaries, newswire articles, literary works, or other documents submitted to the knowledge system 238 as reference materials, as is known in the art. As an example, the knowledge system 238 may be embodied as IBM Watson or a like system.

In regard to the chat server 240, it may be configured to conduct, orchestrate, and manage electronic chat communications with customers. In general, the chat server 240 is configured to implement and maintain chat conversations and generate chat transcripts. Such chat communications may be conducted by the chat server 240 in such a way that a customer communicates with automated chatbots, human agents, or both. In exemplary embodiments, the chat server 240 may perform as a chat orchestration server that dispatches chat conversations among the chatbots and available human agents. In such cases, the processing logic of the chat server 240 may be rules driven so to leverage an intelligent workload distribution among available chat resources. The chat server 240 further may implement, manage and facilitate user interfaces (also UIs) associated with the chat feature, including those UIs generated at either the customer device 205 or the agent device 230. The chat server 240 may be configured to transfer chats within a single chat session with a particular customer between automated and human sources such that, for example, a chat session transfers from a chatbot to a human agent or from a human agent to a chatbot. The chat server 240 may also be coupled to the knowledge management server 234 and the knowledge systems 238 for receiving suggestions and answers to queries posed by customers during a chat so that, for example, links to relevant articles can be provided.

In regard to the web servers 242, such servers may be included to provide site hosts for a variety of social interaction sites to which customers subscribe, such as Facebook, Twitter, Instagram, etc. Though depicted as part of the contact center 200, it should be understood that the web servers 242 may be provided by third parties and/or maintained remotely. The web servers 242 may also provide webpages for the enterprise or organization being supported by the contact center 200. For example, customers may browse the webpages and receive information about the products and services of a particular enterprise. Within such enterprise webpages, mechanisms may be provided for initiating an interaction with the contact center 200, for example, via web chat, voice, or email. An example of such a mechanism is a widget, which can be deployed on the webpages or websites hosted on the web servers 242. As used herein, a widget refers to a user interface component that performs a particular function. In some implementations, a widget may include a graphical user interface control that can be overlaid on a webpage displayed to a customer via the Internet. The widget may show information, such as in a window or text box, or include buttons or other controls that allow the customer to access certain functionalities, such as sharing or opening a file or initiating a communication. In some implementations, a widget includes a user interface component having a portable portion of code that can be installed and executed within a separate webpage without compilation. Some widgets can include corresponding or additional user interfaces and be configured to access a variety of local resources (e.g., a calendar or contact information on the customer device) or remote resources via network (e.g., instant messaging, electronic mail, or social networking updates).

In regard to the interaction (iXn) server 244, it may be configured to manage deferrable activities of the contact center and the routing thereof to human agents for completion. As used herein, deferrable activities include back-office work that can be performed off-line, e.g., responding to emails, attending training, and other activities that do not entail real-time communication with a customer. As an example, the interaction (iXn) server 244 may be configured to interact with the routing server 218 for selecting an appropriate agent to handle each of the deferable activities. Once assigned to a particular agent, the deferable activity is pushed to that agent so that it appears on the agent device 230 of the selected agent. The deferable activity may appear in a workbin 232 as a task for the selected agent to complete. The functionality of the workbin 232 may be implemented via any conventional data structure, such as, for example, a linked list, array, etc. Each of the agent devices 230 may include a workbin 232, with the workbins 232A, 232B, and 232C being maintained in the agent devices 230A, 230B, and 230C, respectively. As an example, a workbin 232 may be maintained in the buffer memory of the corresponding agent device 230.

In regard to the universal contact server (UCS) 246, it may be configured to retrieve information stored in the customer database 222 and/or transmit information thereto for storage therein. For example, the UCS 246 may be utilized as part of the chat feature to facilitate maintaining a history on how chats with a particular customer were handled, which then may be used as a reference for how future chats should be handled. More generally, the UCS 246 may be configured to facilitate maintaining a history of customer preferences, such as preferred media channels and best times to contact. To do this, the UCS 246 may be configured to identify data pertinent to the interaction history for each customer such as, for example, data related to comments from agents, customer communication history, and the like. Each of these data types then may be stored in the customer database 222 or on other modules and retrieved as functionality described herein requires.

In regard to the reporting server 248, it may be configured to generate reports from data compiled and aggregated by the statistics server 226 or other sources. Such reports may include near real-time reports or historical reports and concern the state of contact center resources and performance characteristics, such as, for example, average wait time, abandonment rate, agent occupancy. The reports may be generated automatically or in response to specific requests from a requestor (e.g., agent, administrator, contact center application, etc.). The reports then may be used toward managing the contact center operations in accordance with functionality described herein.

In regard to the media services server 249, it may be configured to provide audio and/or video services to support contact center features. In accordance with functionality described herein, such features may include prompts for an IVR or IMR system (e.g., playback of audio files), hold music, voicemails/single party recordings, multi-party recordings (e.g., of audio and/or video calls), speech recognition, dual tone multi frequency (DTMF) recognition, faxes, audio and video transcoding, secure real-time transport protocol (SRTP), audio conferencing, video conferencing, coaching (e.g., support for a coach to listen in on an interaction between a customer and an agent and for the coach to provide comments to the agent without the customer hearing the comments), call analysis, keyword spotting, and the like.

In regard to the analytics module 250, it may be configured to provide systems and methods for performing analytics on data received from a plurality of different data sources as functionality described herein may require. In accordance with example embodiments, the analytics module 250 also may generate, update, train, and modify predictors or models 252 based on collected data, such as, for example, customer data, agent data, and interaction data. The models 252 may include behavior models of customers or agents. The behavior models may be used to predict behaviors of, for example, customers or agents, in a variety of situations, thereby allowing embodiments of the present invention to tailor interactions based on such predictions or to allocate resources in preparation for predicted characteristics of future interactions, thereby improving overall contact center performance and the customer experience. It will be appreciated that, while the analytics module 250 is depicted as being part of a contact center, such behavior models also may be implemented on customer systems (or, as also used herein, on the "customer-side" of the interaction) and used for the benefit of customers.

According to exemplary embodiments, the analytics module 250 may have access to the data stored in the storage device 220, including the customer database 222 and agent database 223. The analytics module 250 also may have access to the interaction database 224, which stores data related to interactions and interaction content (e.g., transcripts of the interactions and events detected therein), interaction metadata (e.g., customer identifier, agent identifier, medium of interaction, length of interaction, interaction start and end time, department, tagged categories), and the application setting (e.g., the interaction path through the contact center). Further, as discussed more below, the analytic module 250 may be configured to retrieve data stored within the storage device 220 for use in developing and training algorithms and models 252, for example, by applying machine learning techniques.

One or more of the included models 252 may be configured to predict customer or agent behavior and/or aspects related to contact center operation and performance. Further, one or more of the models 252 may be used in natural language processing and, for example, include intent recognition and the like. The models 252 may be developed based upon 1) known first principle equations describing a system, 2) data, resulting in an empirical model, or 3) a combination of known first principle equations and data. In developing a model for use with present embodiments, because first principles equations are often not available or easily derived, it may be generally preferred to build an empirical model based upon collected and stored data. To properly capture the relationship between the manipulated/disturbance variables and the controlled variables of complex systems, it may be preferable that the models 252 are nonlinear. This is because nonlinear models can represent curved rather than straight-line relationships between manipulated/disturbance variables and controlled variables, which are common to complex systems such as those discussed herein. Given the foregoing requirements, a machine learning or neural network-based approach is presently a preferred embodiment for implementing the models 252. Neural networks, for example, may be developed based upon empirical data using advanced regression algorithms.

The analytics module 250 may further include an optimizer 254. As will be appreciated, an optimizer may be used to minimize a "cost function" subject to a set of constraints, where the cost function is a mathematical representation of desired objectives or system operation. Because the models 252 may be non-linear, the optimizer 254 may be a nonlinear programming optimizer. It is contemplated, however, that the present invention may be implemented by using, individually or in combination, a variety of different types of optimization approaches, including, but not limited to, linear programming, quadratic programming, mixed integer nonlinear programming, stochastic programming, global nonlinear programming, genetic algorithms, particle/swarm techniques, and the like.

According to exemplary embodiments, the models 252 and the optimizer 254 may together be used within an optimization system 255. For example, the analytics module 250 may utilize the optimization system 255 as part of an optimization process by which aspects of contact center performance and operation are optimized or, at least, enhanced. This, for example, may include aspects related to the customer experience, agent experience, interaction routing, natural language processing, intent recognition, or other functionality related to automated processes.

The various components, modules, and/or servers of FIG. 2 (as well as the other figures included herein) may each include one or more processors executing computer program instructions and interacting with other system components for performing the various functionalities described herein. Such computer program instructions may be stored in a memory implemented using a standard memory device, such as, for example, a random-access memory (RAM), or stored in other non-transitory computer readable media such as, for example, a CD-ROM, flash drive, etc. Although the functionality of each of the servers is described as being provided by the particular server, a person of skill in the art should recognize that the functionality of various servers may be combined or integrated into a single server, or the functionality of a particular server may be distributed across one or more other servers without departing from the scope of the present invention. Further, the terms "interaction" and "communication" are used interchangeably, and generally refer to any real-time and non-real-time interaction that uses any communication channel including, without limitation, telephone calls (PSTN or VoIP calls), emails, vmails, video, chat, screen-sharing, text messages, social media messages, WebRTC calls, etc. Access to and control of the components of the contact system 200 may be affected through user interfaces (UIs) which may be generated on the customer devices 205 and/or the agent devices 230. As already noted, the contact center 200 may operate as a hybrid system in which some or all components are hosted remotely, such as in a cloud-based or cloud computing environment.

Routing of Customer Interactions

Figure 3:
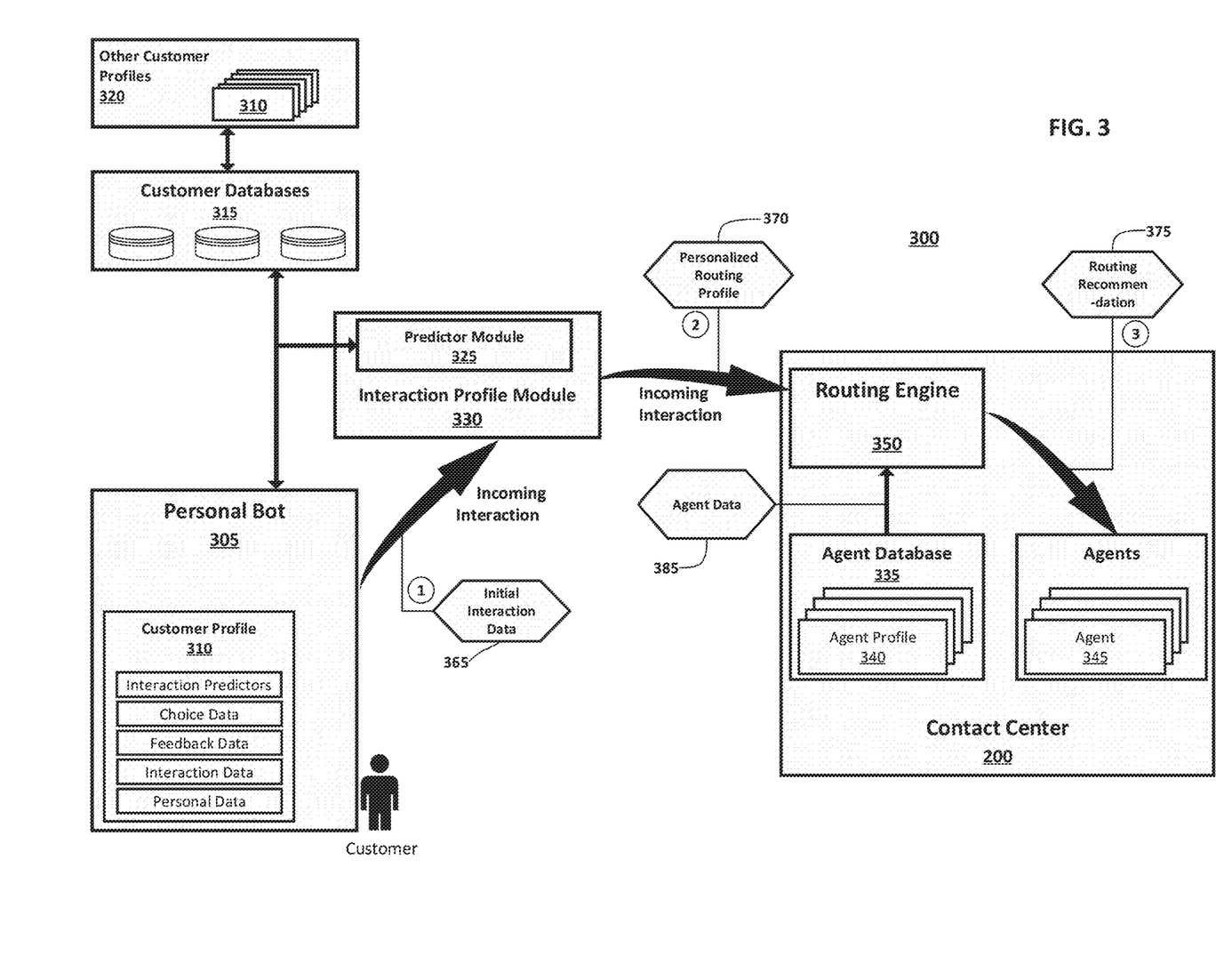
FIG. 3 is a schematic representation of an automated routing system in accordance with the present invention and/or with which exemplary embodiments of the present invention may be enabled or practiced.
Figure 4:
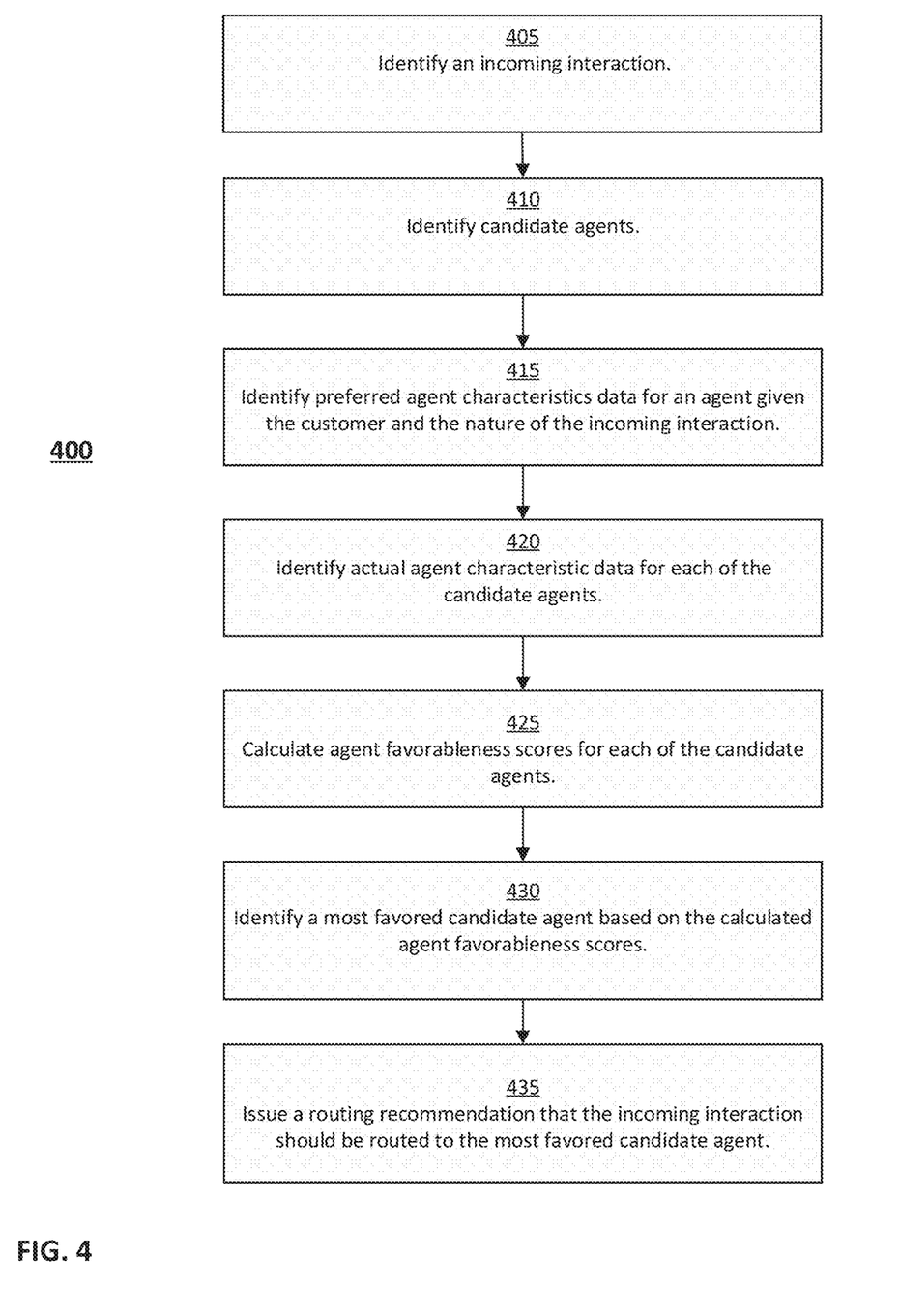
FIG. 4 is an automated routing process in accordance with the present invention and/or with which exemplary embodiments of the present invention may be enabled or practiced.

With specific reference to FIGS. 3 and 4, attention will now focus on exemplary methods and systems for predictive or intelligent routing of incoming interactions at a contact center. As will be appreciated, such systems and methods can improve routing of interactions by using algorithms that leverage data about customers, interactions, and agents to make favorable matches between agents and customers or agents and interactions.

By way of background, contact centers have long used automated systems to desirably route incoming interactions to particular agents. Early routing systems were primarily intent based. Such systems would simply match an incoming interaction to an available agent based on the intent of the query, with the intent being matched to a static description of an agent's skillset. Later, predictive routers were developed that used more sophisticated routing rules and models. In these systems, agents were rated in multiple performance categories, and those ratings were more regularly updated with results from recently handled interactions. The rating categories, for example, might include performance data such as first call resolution rate, average handle time, customer satisfaction rate, etc. An agent would be selected not only on the nature of the query and his skillset, but also on performance. Customer profiles eventually were developed so that greater amounts of customer data could be used in the routing process. Advances in data collection increased the amount and variety of data being collected about customers and interactions. Such data proved valuable in finding insights that are useful in routing decisions.

With specific reference to FIG. 3, a system 300 is shown in which customer data is used to facilitate routing decisions that are personalized to individual customers. It should be understood that the routing systems and methods described herein are exemplary only and not meant to limit the types of routing that the present invention may be used with. As shown, the system 300 includes a personal bot 305, a customer profile 310, customer databases 315, other customer profiles 320, a predictor module 325, an interaction profile module 330, and a contact center 200. Further, the contact center 200 includes an agent database 335, agent profiles 340 corresponding to agents 345, and a routing engine 350.

Customer data that is stored in relation to the customer profile 310 may include several types of information, including for example, personal data, interaction data, feedback data, and/or choice data. Such aggregated and rich data sources may be used by modern routing systems to enable more accurate and reliable routing models and produce decisions that are more personalized to individual customers. In accordance with such systems, data driven analytics, such as machine learning, may be applied to particular datasets—for example, the personalized customer profile 310 and the customer databases 315—in order to improve automated routing of incoming customer interactions.

Customer profile data may be collected through the implementation of the personal bot 305 running on a customer device, such as any of those already described. According to exemplary embodiments, the personal bot 305 may gather information as the customer interacts with different contact centers, and newly acquired data may be used to dynamically update the customer profile 310 and customer databases 315 in real time. The personal bot 305, as used herein, may generally reference any customer-side implementation of applications or other automated processes that assists the customer to interact with contact centers or customer service providers. In regard to system architecture, the personal bot 305 may be implemented as a software program or application running on a mobile device or personal computing device of the customer, where the personal bot 305 facilitates the creation and maintenance of a personalized customer profile database or module (or simply "customer profile") 310.

For the sake of an example, a customer may have a mobile device or smart phone on which is running an application implementing local aspects of the personal bot 305. In setting up a customer profile 310, the personal bot 305 may serve as a means for the customer to input information. For example, the personal bot 305 may prompt and accept direct input of information from the customer by voice or text. The customer may also upload files to the personal bot 305 or provide the personal bot 305 with access to pre-existing databases or other files from which information about the customer may be obtained. The personal bot 305 also may gather information about the customer by monitoring customer behavior and actions through the customer's use of the device. For example, the personal bot 305 may collect data that relates to other activities that the customer performs through the device, such as email, text, social media, internet usage, etc. The personal bot 305 also may monitor and collect data from each of the interactions the customer has with customer service providers, such as a contact center 200, through the customer device. In this way, data may be collected from interactions occurring with many different contact centers. In use, at the conclusion of each interaction, the personal bot 305 of the present invention may update the profile of the customer in accordance with data gleamed from that interaction.

Once the customer profile is updated, it will include data associated with that most recent interaction as well as data from other past interactions. This updated or current dataset then may be analyzed in relation to one or more customer databases 315, which, as used herein, are data repositories housing customer data, such as interaction data relating to past interactions, from a large population of other customers. The analysis may be performed with the predictor module 325, which may include a machine learning algorithm that is configured to find data driven insights or predictors (or, as used herein, "interaction predictors"). As used herein, the interaction predictors represent a behavioral factor attributable to the customer given a type of interaction. The behavioral factor of the interaction predictor may include an emotional state, behavioral tendency, or preference for a particular customer given a type of interaction (also "interaction type"). The interaction predictor may be generated and applied in real time, for example, by the predictor module 325. Alternatively, the interaction predictors may be determined and stored in the customer profile 310 of a given customer as a way to augment or further personalize the profile. Such stored interaction predictors then may be applied in future interactions involving the customer when found relevant thereto. Thus, in general, a personal bot 305 may gather relevant information as a customer interacts with contact centers on his mobile device. The personal bot 305 may gather other types of information, as described above, and then may aggregate that data to build a highly personalized customer profile 310.

As indicated in the example of FIG. 3, the system 300 may be arranged such that the incoming interaction passes through three particular stages, though, it will be appreciated, that other configurations are also possible. First, the customer or personal bot 305 may initiate an incoming interaction with the contact center 200. In this initial stage, initial interaction data 365 is determined and transmitted (1) to the interaction profile module 330. Second, the interaction profile module 330 may then generate a personalized routing profile 370, which is transmitted (2) to a routing engine 350 of the contact center 200. The personalized routing profile 370 may be based on the initial interaction data 365 and other data stored about the customer, including any relevant interaction predictors. Third, the routing engine 375 generates (2) a routing recommendation 375 that is implemented via connecting the customer with a selected one of the agents. In making this recommendation, the routing engine 350 may take into account agent data 385 that provided to the routing engine 350 via the agent databases 335. The agent database 335 may include agent profiles 340 corresponding to the available agents 345. Such agent profiles may include agent experience, training, personality type, performance characteristics, etc.

The initial interaction data 365 may include data disclosing at least an intent of the incoming interaction and the contact center 200 for which the interaction is intended. Using this information, the incoming interaction may be classified as being a particular type of interaction. For example, a type of interaction may be defined by a particular type of intent or subject matter. This information may be used by the interaction profile module 330 to begin building the personalized interaction profile. As used therein, the personalized routing profile is a collection of data specifically tailored to a particular interaction for a particular customer. The personalized routing profile, thus, may include specific data pertaining to the interaction and the customer that is used to facilitate the routing of interactions in accordance customer preferences. According to exemplary embodiments, the interaction profile module 330 builds the personalized routing profile according to preferred agent characteristics data for the first customer for the given type of interaction. The interaction profile module 330 may include (or at least may communicate with) the predictor module 325, which, as described above, has access to data stored in the customer profile 310 and/or the customer databases 315. For example, contextual information or factors related to the incoming interaction may be identified, and based on those identified factors, predictions can be made about the customer by determining which of the stored interaction predictors are applicable. It should also be understood that such predictions about the customer may be made contemporaneously with the incoming interaction via the machine learning algorithm (or models developed therefrom) finding similarities in the contextual information around the incoming interaction and past interactions experienced by the customer and/or other similar customers within the customer databases 315. In either case, one or more interaction predictors applicable to the incoming interaction may be used to facilitate the delivery of services to the customer in relation to the incoming interaction. Thus, relevant interaction predictors along with any other relevant information from the customer profile 310 may be packaged within an interaction profile and then delivered to the contact center 200 for use thereby. The contact center 200 may then use this packaged data facilitate decisions as to how the interaction should be routed and the nature of services that should be provided to the customer.

The routing engine 350 is a logic engine that makes routing decisions based on stored algorithms, models, rules, equations or other logic. In operation, the routing engine 350: a) receives data from the interaction profile module 330 that relates to the incoming interaction, i.e., the personalized routing profile 370; b) receives data maintained by the contact center 200 in the form of agent data 385; and c) applies logic to the received data to calculate a routing recommendation 375. The routing engine 350 and/or contact center 200 may then implement the routing recommendation 375 via connecting the incoming interaction with the selected one of the agents 345. Additional information related to predictive routing and the functionality of system 300 are provided in U.S. application Ser. No. 16/730,751, filed on Dec. 30, 2019 and published on Jul. 1, 2021 as U.S. 2021-0203784, entitled "System and Method Relating to Customer Experience Automation", the content of which is incorporated herein by reference.

With specific reference now to FIG. 4, an exemplary routing method 400 is provided for selecting an agent to handle an incoming interaction based on customer preferences. As will be appreciated, the routing method 400 represents the processes that primarily occur within a routing engine, such as routing engine 350, and not the processes that occur within the interaction prediction module 330. The routing process 400 includes some specific terminology, which will now be defined in accordance with intended usage:

"first customer" is a reference customer that is provided in the example incoming interaction;

"incoming interaction" is a present communication (i.e., just instigated) between the first customer and a contact center;

"candidate agents" are two or more agents of the contact center that are available and/or otherwise qualified to handle the incoming interaction;

"agent criteria" are a set of agent characteristics or criterion, wherein each agent criterion defines a basis by which a characteristic of an agent can be rated or evaluated;

"preferred agent characteristics data" is data describing the preferences of the first customer in relation to the agent criteria;

"actual agent characteristics data" is data describing how a particular one of the candidate agents rates in relation to the agent criteria;

"agent favorableness score" is a score reflecting the favorableness of a particular one of the candidate agents based upon how closely the actual agent characteristics data, which rates the actual characteristics of the particular agent, matches the preferred agent characteristics data of the first customer (this idea can also be expressed as a "match favorableness score", i.e., the favorableness of a proposed match between an agent and customer);

"evaluation of candidate agents" is an evaluation wherein an agent favorableness score is calculated for each of the available agents and, from the relative values of the calculated agent favorableness scores, a most favored candidate agent is identified;

"favored agent routing recommendation" is a routing recommendation that the incoming interaction of the first customer be routed to the most favored candidate agent.

In an example of operation, the routing process 400 may begin at step 405 where an incoming interaction is identified. The incoming interaction represents a communication between a customer and the contact center 200 that has been initiated, but not yet connected with an agent. For example, the incoming interaction may be a communication just instigated by a customer (referenced for the example as a "first customer") over any available communication channel. The incoming interaction may be identified by the interaction profile module 330 by initial interaction data 365 transmitted to it from the personal bot 305. The initial interaction data 365 may include data relating to the incoming interaction that is relevant to the building of the personalized routing profile 370. For example, the initial interaction data 365 may include data about the first customer and data about the interaction, such as the intent and other contextual factors related to the incoming interaction. Alternatively, the initial interaction data 365 may include very limited information, with additional information being retrieved by the interaction profile module 330 from connected databases, customer profiles, etc.

The routing process 400 continues at step 410 where candidate agents are identified. As used herein, candidate agents are two or more agents of the contact center that are available and/or otherwise qualified to handle the incoming interaction. In exemplary embodiments, the candidate agents may be identified by the contact center 200 after a prompt is provided. Such prompt may be provided by the routing engine 350 upon identifying the incoming interaction (for example, upon receiving the personalized routing profile 370 from the interaction predictor module). Such prompt may include information that is necessary for the contact center 200 to identify the candidate agents, such as, the intent of the incoming interaction.

The routing process 400 continues at step 415 where the preferred agent characteristics data for an agent is identified for the first customer. As used herein, preferred agent characteristics data is information describing the preferences of the first customer in relation to the agent criteria. As stated in the definitions above, the agent criteria are a set of agent criterion, where each criterion defines a basis by which a characteristic of an agent can be rated or evaluated. For example, an agent criterion may evaluate an aspect of an agent's personality, such as whether the agent is more playful or more serious. The preferred agent characteristics data may reflect that, for the incoming interaction, the first customer prefers a more playful agent.

In accordance with exemplary embodiments, the preferred agent characteristics data may be included within the data transmitted by the interaction profile module 330 in the personalized interaction profile. The preferred agent characteristics data may be determined by the interaction profile module 330 and may include predictions as to the preferences of the first customer. With access to data relating to each of the first customer's past interactions and other activities performed via the first customer's mobile device, customer-side systems (e.g., the personal bot 305, interaction profile module 330, and the predictor module 325) are generally well-positioned to make data driven inferences that provide the basis for such predictions. As will be seen, such predictions may be based on the intent of the incoming interaction and/or other contextual factors relating to the incoming interaction. For example, such predictions may be based on the applicability of one or more interaction predictors stored within the customer profile, such as those related to an emotional state of the customer or severity rating of the interaction.

The routing process 400 continues at step 420 where the actual agent characteristics data for each of the candidate agents is identified. As used herein, actual agent characteristics data is data describing how a particular candidate agent rates in relation to the agent criteria. As will be appreciated, the actual agent characteristics data for each of the agents may be stored within agent profiles 340 maintained in the agent database 335 of the contact center 200. The actual agent characteristics data may be part of the agent data 385 that is transmitted to the routing engine 350.

The routing process 400 continues by evaluating the candidate agents. As described more below, the evaluation of the candidate agents may include two steps: a) calculating an agent favorableness score for each of the available agents (step 425); and b) identifying, from the relative values of the calculated scores, a most favored candidate agent (step 430).

Thus, at step 425, the routing process 400 proceeds by calculating agent favorableness scores for each of the candidate agents. An agent favorableness score (also "match favorableness score") is a score reflecting the favorableness of particular one of the candidate agents based upon how closely the actual agent characteristics data, which describes the actual characteristics of the particular agent, matches the preferred agent characteristics data of the first customer. As will be appreciated, this may be accomplished using a variety of different scoring systems and algorithms. In general, the candidate agents will be scored via the agent criteria, with the score for each being indicative of how closely the actual agent characteristics data satisfies the preferred agent characteristics data of the first customer. For example, the agent favorableness score may be a cumulative score that reflects how well a particular agent scores in regard to all of the agent criteria. As another example, the scoring system may be a weighted one that places greater importance to certain agent criterion over others. In such cases, the weights applied to each category may be the same for all customers. Alternatively, the way the weights are applied could be varied between customers and, thus, be used as another mechanism to express different customer preferences.

At step 430, as stated above, the routing process 400 proceeds by identifying a most favored candidate agent based on the calculated agent favorableness scores. As will be appreciated, this step may be performed by comparing the relative values of the calculated agent favorableness scores and determining which is the best and, thus, reflective of a most favored agent given the first customer's preferences.

The routing process 400 then continues at step 435 where a routing recommendation is issued. As will be appreciated, the routing recommendation may be that the incoming interaction is routed to the most favored candidate agent. This step may include the routing engine 350 transmitting the routing recommendation 375 so that the recommendations is implemented, i.e., the first customer is connected to the most favored candidate agent.

Contact centers often employ this type of intelligent or predictive routing in order to match incoming interactions from customer with available resources and agents in order to better satisfy customer and/or further some business objective. Predictive routing can use particular ranking algorithms that uses certain techniques, such as machine learning, to build a model for optimal customer-agent pairing. As already discussed, there are multiple factors by which such pairing can be evaluated, such as, for example, knowledge and experience level of the agent, agent skill set, type of interaction, customer characteristics and preferences, etc.

There, however, are some shortcomings with conventional predictive routing systems, such as the one discussed above. Specifically, in conventional routing systems, the assignment of an incoming call or chat (i.e., incoming interaction) to an available agent is triggered by an event such as the arrival of the interaction or an agent becoming available. When multiple agents are available simultaneously, ranking algorithms can be applied to select the best agent for a particular call based on desired business rules or objectives. Similarly, when multiple incoming interactions are queued, ranking algorithms may be applied to select the best incoming interaction for a particular agent. When the number of calls or number of available agents is few, however, the immediate nature of assigning calls to agents based on availability means that ranking algorithms have limited or no latitude to operate within. This negatively impacts the performance of the ranking algorithm.

Figure 5:
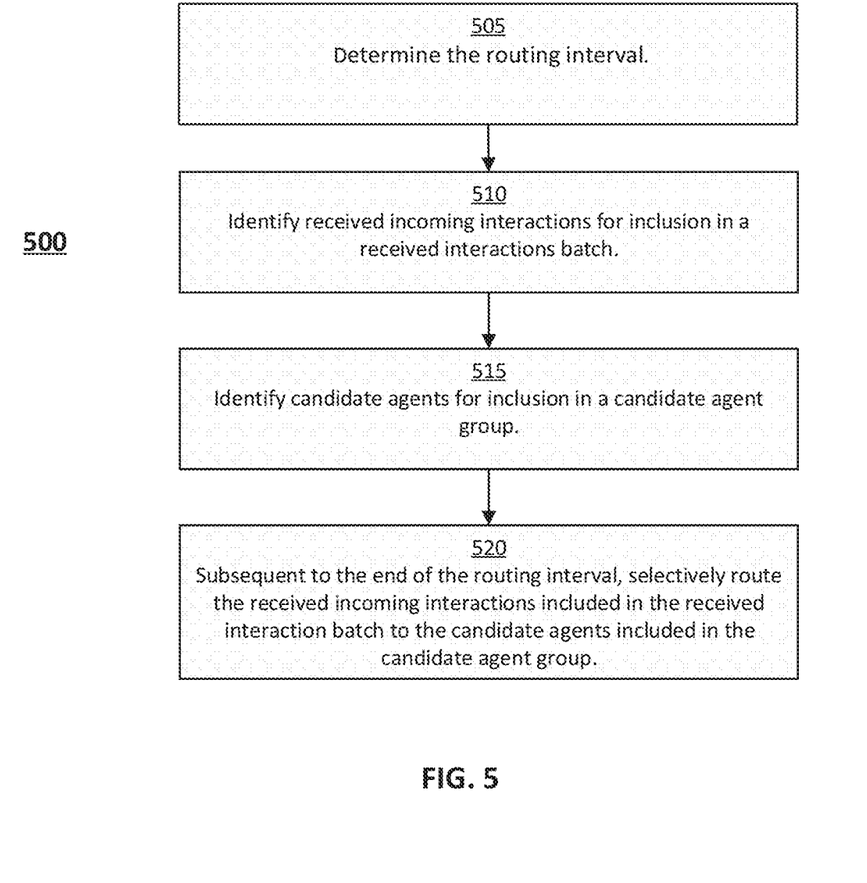
FIG. 5 is an automated routing process in accordance with the present invention.

With reference now to FIG. 5, the present invention proposes several improvements in the way that predictive routing matches customer to agent. As will be seen, the proposed solution introduces a waiting period—referred to herein as a "routing interval"—that allows multiple calls and/or multiple agents to accumulate before the ranking algorithm is applied. This generally improves the performance of conventional ranking algorithms while also allowing for the design of new ranking algorithms that optimizes customer-agent pairings across the group or batch rather than just individually. As will be seen, one way to implement such a system is to route interactions at fixed waiting intervals. That is, the routing algorithm may route incoming interactions every 6 seconds so that all interactions that arrived with the defined period will be routed as a group to those agents that are found to be available at end of the fixed period. This functionality is then repeated for the next fixed interval, and in this way, incoming interactions pulse through the system at fixed intervals. As will also be seen, the present invention proposes several variations as to how the routing interval is determined that may further improve the functionality of this routing strategy. For example, the routing interval may be initiated only when the first interaction is received after the previous routing interval ended. Alternatively, the routing interval may be cut short once a sufficient number of interactions are received and/or agents become available. The interval also may be extended in some cases when not enough interactions are received or agents available. As another example, the interval between routings may be varied dynamically based on certain contact center operating characteristics. Such embodiments will now be discussed in more detail. As will be appreciated, though, each embodiment stems from the counterintuitive observation—particularly in an industry like customer service where quick response time is often judged the most significant factor—that delaying the routing of incoming interactions and potentially lengthening the wait time of customer improves both contact center performance and customer satisfaction.

The present invention, thus, includes a computer-implemented method for routing incoming interactions in a contact center. As will be appreciated, incoming interactions are communications instigated by customers for communicating with the contact center, and the contact center has agents between which the incoming interactions are routed. With reference to method 500 of FIG. 5, according to example embodiments, the method includes the steps of: (step 505) determining a routing interval; (step 510) identifying received incoming interactions for inclusion in a received interactions batch, each of the received incoming interactions being identified as ones of the incoming interactions that are received within the routing interval; (step 515) identifying candidate agents for inclusion in a candidate agent group, the candidate agents being identified as available ones of the agents to whom the received incoming interactions of the received interaction batch can be routed; and (step 520) subsequent to the end of the routing interval, selectively routing the received incoming interactions included in the received interaction batch to the candidate agents included in the candidate agent group. Each one of these steps will now be discussed in detail along with other aspects of the present invention.

According to example embodiments, the routing interval is defined as a waiting period during which at least one of the received incoming interactions and the candidate agents are allowed to accumulate before the routing occurs. Additionally, the method may be repeated for a plurality of consecutive routing intervals.

According to example embodiments, the routing interval may be implemented with predictive routing, such as that already described in which machine learning or other statistical algorithm is used to rank each agent in a candidate agent group as to how well that agent is predicted to handle a specific interaction. As an example, predictive routing may be based on an agent-interaction match most likely to result in an optimal or improved key performance indicator (KPI) value. Thus, the routing may include calculating a match favorableness score between pairings of the candidate agents and the received incoming interactions and then selectively routing the incoming interactions in accordance with those rankings. To perform this type of selective or predictive routing, the present method may include determining a plurality of agent characteristics for each of the of the candidate agents and determining a plurality of interaction characteristics related to each of the received incoming interactions of the received interaction batch. Further, the step of calculating the match favorableness score may include an algorithm that takes into account the plurality of interaction characteristics of the received incoming interactions and the plurality of agent characteristics of the candidate agents. The match favorableness score may include a mathematical representation indicative of how closely the plurality of agent characteristics for the candidate agent paired with a particular received incoming interactions matches what is deemed an ideal candidate agent for pairing with the particular received incoming interaction. According to exemplary embodiments, the ideal candidate agent is based on the plurality of interaction characteristics of the particular received incoming interaction.

In exemplary embodiments, the selective or predictive routing used with the routing interval may include maximizing a batch favorableness score. The batch favorableness score, as used herein, is a combined score for the batch or entire group that is being routed in a particular routing interval, i.e., a score considers the match favorableness scores for each of the pairings of the candidate agents and the received incoming interactions. In such case, for example, the predictive routing may be based on maximizing a KPI value across the group of interactions being matched to agents in a particular routing interval.

According to exemplary embodiments, the plurality of interaction characteristics that may be used in the routing may include one or more of: an intent of the incoming interaction; subject matter of the incoming interaction; characteristic related to the customer associated with the received incoming interaction; preference of the customer associated with the received incoming interaction; or any other discussed herein. The plurality of agent characteristics that may be used in the routing may include at least one: an agent skill level; agent performance level; agent training level; agent experience in handling interactions having a particular intent; agent subject matter expertise; or any of other discussed herein.

As stated, the routing interval may be fixed or may vary. The step of determining the routing interval may include determining a start and an end of the routing interval. The step of identifying the received interaction batch, thus, may include identifying ones of the incoming interactions that are received between the start and the end to the routing interval. The step of identifying the candidate agent group may include identifying which of the agents are available at the end of the routing interval. In accordance with an alternative embodiment, the step of identifying the candidate agent group may include identifying which of the agents become available between the start and the end to the routing interval.

The step of determining the start of the routing interval may include defining the start as occurring immediately after an end to the preceding routing interval (i.e., the routing interval occurring just before the routing interval just starting). In an alternative embodiment, the step of determining the start of the routing interval may include delaying the start until when the received interaction batch includes at least one of the received incoming interactions. In this way, any period of time between the end of the preceding routing interval and the receiving of the next incoming interaction, which necessarily is a period in which no customer is waiting, becomes a dead period (i.e., when no routing interval is accruing). It is the reception of the first incoming interaction—and, thus, a point marking when a customer begins waiting—that triggers the start of the next routing interval.

In exemplary embodiments, as stated, the routing interval may be a fixed period of time, i.e., have a predetermined fixed duration. In such cases, the step of determining the end of an ongoing or present routing interval may include scheduling the end of that routing interval to be offset from the start of that routing interval by the predetermined fixed duration. In certain preferred embodiments, it has been found that a fixed duration of between 4 and 10 seconds promotes several performance objectives.

In other exemplary embodiments, the step of determining the routing interval may include determining a length of the routing interval in relation to an operations metric of the contact center. In this way, the length of the routing interval may vary dynamically depending on a measured performance indicator of the contact center. In preferred embodiments, the operations metric includes one measuring a rate at which the contact center is receiving incoming interactions. Such measurement may have been taken prior to the start of the present routing interval.

In other exemplary embodiments, the end of the routing interval may be determined in relation to a triggering event. In such cases, the step of determining the end of the routing interval may include defining the end as coinciding with an occurrence of the triggering event. In certain preferred embodiments, the triggering event may include whichever of the following events occurs first: a predetermined target number of the received incoming interactions being identified during the routing interval; and a duration of the routing interval exceeding a predetermined maximum duration. In such cases, there is a defined maximum of the interval so to not overly prolong customer wait times. In an alternative embodiment, the triggering event may include whichever of the following events occur first: a predetermined target number of the candidate agents being identified during the routing interval; and the routing interval reaching a predetermined maximum time period in duration. In yet another alternative embodiment, the triggering event may include an occurrence of both: a predetermined target number of the received incoming interactions being identified during the routing interval; and a predetermined target number of the candidate agents being identified during the routing interval.

As one of skill in the art will appreciate, the many varying features and configurations described above in relation to the several exemplary embodiments may be further selectively applied to form the other possible embodiments of the present invention. For the sake of brevity and taking into account the abilities of one of ordinary skill in the art, each of the possible iterations is not provided or discussed in detail, though all combinations and possible embodiments embraced by the several claims below or otherwise are intended to be part of the instant application. In addition, from the above description of several exemplary embodiments of the invention, those skilled in the art will perceive improvements, changes and modifications. Such improvements, changes and modifications within the skill of the art are also intended to be covered by the appended claims. Further, it should be apparent that the foregoing relates only to the described embodiments of the present application and that numerous changes and modifications may be made herein without departing from the spirit and scope of the present application as defined by the following claims and the equivalents thereof.

That which is claimed:

1. A computer-implemented method for routing incoming interactions in a contact center, wherein the incoming interactions are instigated by customers for communicating with the contact center, and the contact center comprises agents between which the incoming interactions are routed, the method comprising the steps of:
   determining a routing waiting period;
   identifying received incoming interactions for inclusion in a received interactions batch, each of the received incoming interactions being identified as ones of the incoming interactions that are received within the routing waiting period;
   identifying candidate agents for inclusion in a candidate agent group, the candidate agents being identified as available ones of the agents to whom the received incoming interactions of the received interaction batch can be routed; and
   subsequent to the end of the routing waiting period, selectively routing the received incoming interactions included in the received interaction batch to the candidate agents included in the candidate agent group;
   wherein the routing waiting period comprises a predetermined delay during which both the received incoming interactions and the candidate agents are allowed to accumulate before computation associated with the step of selectively routing is allowed to take place, the delay associated with the routing waiting period thereby lengthening a wait time that respective customers associated with the received incoming interactions have to wait before being connected with an agent.

2. The method according to claim 1,
wherein the method is repeated for a plurality of consecutive ones of the routing waiting period; and
wherein the step of selectively routing comprises predictive routing.

3. The method according to claim 1, wherein the step of selectively routing comprises calculating a match favorableness score between pairings of the candidate agents and the received incoming interactions and routing the received incoming interactions to the candidate agents based on the calculated match favorableness scores.

4. The method according to claim 3, further comprising the steps of:
determining a plurality of agent characteristics for each of the of the candidate agents; and
determining a plurality of interaction characteristics related to each of the received incoming interactions of the received interaction batch;
wherein the calculating the match favorableness score comprises an algorithm that takes into account the plurality of interaction characteristics of the received incoming interactions and the plurality of agent characteristics of the candidate agents.

5. The method according to claim 4, wherein the match favorableness score comprises a mathematical representation indicative of how closely the plurality of agent characteristics for the candidate agent paired with a particular received incoming interactions matches what is deemed an ideal candidate agent for pairing with the particular received incoming interaction, wherein the ideal candidate agent is based on the plurality of interaction characteristics of the particular received incoming interaction.

6. The method according to claim 5, wherein the step of selectively routing further comprises maximizing a batch favorableness score, the batch favorableness score comprising a combined score taking into account the match favorableness scores for each of the pairings of the candidate agents and the received incoming interactions.

7. The method according to claim 6, wherein the batch favorableness score comprises a score indicating a likelihood that matches between the candidate agents and the received incoming interactions result in optimizing a value of a key performance indicator of the contact center.

8. The method according to claim 5, wherein the plurality of interaction characteristics comprises at least two of:
an intent of the incoming interaction;
a subject matter of the incoming interaction;
a characteristic of the customer associated with the received incoming interaction; and
wherein the plurality of agent characteristics comprises at least two of:
an agent performance level;
an agent subject matter expertise; and
an agent experience level in handling interactions having a particular intent.

9. The method according to claim 8, wherein the step of identifying the received interaction batch comprises identifying ones of the incoming interactions that are received between the start and the end to the routing waiting period; and
wherein the step of identifying the candidate agent group comprises identifying which of the agents are available at the end of the routing waiting period.

10. The method according to claim 9, wherein the end of the routing waiting period comprises a triggering event such that the step of determining the end of the routing waiting period comprises defining the end as coinciding with an occurrence of the triggering event;
wherein the triggering event comprises whichever of the following events occurs first:
a predetermined target number of the received incoming interactions being identified during the routing waiting period; and
a duration of the routing waiting period exceeding a predetermined maximum duration.

11. The method according to claim 8, wherein the determining the start of the routing waiting period comprises defining the start as occurring immediately after an end to a preceding routing waiting period occurring just before the routing waiting period;
wherein the step of identifying the received interaction batch comprises identifying ones of the incoming interactions that are received between the start and the end to the routing waiting period; and
wherein the identifying the candidate agent group comprises identifying which of the agents become available between the start and the end to the routing waiting period.

12. The method according to claim 11, wherein the end of the routing waiting period comprises a triggering event such that the step of determining the end of the routing waiting period comprises defining the end as coinciding with an occurrence of the triggering event;
wherein the triggering event comprises whichever of the following events occur first:
a predetermined target number of the candidate agents being identified during the routing waiting period; and
the routing waiting period reaching a predetermined maximum time period in duration.

13. The method according to claim 11, wherein the end of the routing waiting period comprises a triggering event such that the step of determining the end of the routing waiting period comprises defining the end as coinciding with an occurrence of the triggering event;
wherein the triggering event comprises an occurrence of both:
a predetermined target number of the received incoming interactions being identified during the routing waiting period; and
a predetermined target number of the candidate agents being identified during the routing waiting period.

14. The method according to claim 8, wherein the determining the start of the routing waiting period comprises delaying the start until when the received interaction batch includes at least one of the received incoming interactions.

15. The method according to claim 8, wherein the routing waiting period comprises a predetermined fixed duration such that the determining the end of the routing waiting period comprises scheduling the end of the routing waiting period to be offset from the start of the routing waiting period by the predetermined fixed duration; and
wherein the fixed duration comprises between 4 and 10 seconds.

16. The method according to claim 8, wherein the determining the routing waiting period comprises determining a length of the routing waiting period in relation to an operations metric of the contact center; and
wherein the operations metric comprises a measure of a rate at which the contact center is receiving the incoming interactions.

17. The method according to claim 4, wherein the match favorableness score comprises a score indicating a likelihood that a match between a particular agent of the candidate agents and a particular one of the received incoming interactions results in optimizing a value of a key performance indicator of the contact center.

18. The method according to claim 5, wherein the determining the routing waiting period comprises:
   determining a start of the routing waiting period; and
   determining an end of the routing waiting period.

19. A system for routing incoming interactions in a contact center, wherein the incoming interactions are instigated by customers for communicating with the contact center, and the contact center comprises agents between which the incoming interactions are routed, the system comprising:
   a hardware processor; and
   a machine-readable storage medium on which is stored instructions that cause the hardware processor to execute a process that includes the steps of:
      determining a routing waiting period;
      identifying received incoming interactions for inclusion in a received interactions batch, each of the received incoming interactions being identified as ones of the incoming interactions that are received within the routing waiting period;
      identifying candidate agents for inclusion in a candidate agent group, the candidate agents being identified as available ones of the agents to whom the received incoming interactions of the received interaction batch can be routed; and
      subsequent to the end of the routing waiting period, selectively routing the received incoming interactions included in the received interaction batch to the candidate agents included in the candidate agent group;
   wherein the routing waiting period comprises a waiting period during which both the received incoming interactions and the candidate agents are allowed to accumulate computation associated with the step of selectively routing is allowed to take place, the delay associated with the routing waiting period thereby lengthening a wait time that respective customers associated with the received incoming interactions have to wait before being connected with an agent.

20. The system according to claim 19, wherein the process further includes the steps of:
   determining a plurality of agent characteristics for each of the of the candidate agents; and
   determining a plurality of interaction characteristics related to each of the received incoming interactions of the received interaction batch;
   wherein the step of selectively routing comprises calculating a match favorableness score between pairings of the candidate agents and the received incoming interactions and routing the received incoming interactions to the candidate agents based on the calculated match favorableness scores; and
   wherein the match favorableness score is based on the plurality of interaction characteristics of the received incoming interactions and the plurality of agent characteristics of the candidate agents.

* * * * *